United States Patent [19]

Stephan et al.

[11] Patent Number: 5,020,925
[45] Date of Patent: Jun. 4, 1991

[54] PRESTRESSED ROLLING RADIAL BEARING AND ITS APPLICATION PARTICULARLY TO AUTOMOBILE SUSPENSIONS

[75] Inventors: Gérard Stephan, Croissy-sur-Seine; Jean-Denis Labedan, Bourges, both of France

[73] Assignee: Nadella, Vierzon, France

[21] Appl. No.: 557,731

[22] Filed: Jul. 26, 1990

[30] Foreign Application Priority Data

Aug. 10, 1989 [FR] France ................... 8910788

[51] Int. Cl.⁵ .......................................... F16C 33/58
[52] U.S. Cl. .................................... 384/569; 384/581
[58] Field of Search ............ 384/569, 581, 535, 513, 384/584

[56] References Cited

U.S. PATENT DOCUMENTS 3,009,748 11/1961 Pitner .................................. 384/581
4,002,380 1/1977 Bowen .
4,971,458 11/1990 Carlson ............................. 384/581

FOREIGN PATENT DOCUMENTS 1079848 12/1954 France .
2250399 5/1975 France .

Primary Examiner—Lenard A. Footland
Attorney, Agent, or Firm—Robert E. Burns; Emmanuel J. Lobato

[57] ABSTRACT

This bearing comprises an external piece (10) with a cylindrical housing (11), a hollow insert sleeve (20) with a circular external wall (21) and a curvilinear triangular internal wall (22), an internal piece (30) with a circular external seating (31) and rolling elements (40) interposed between sleeve and seating.

The sleeve is a relatively thin and, for example, press-formed bush, with non-constant thickness, engaged under force in the housing in such a way that the external piece (10) alone exerts a prestress.

Application to systems in which it is necessary to obtain a bearing effect without the slightest radial play without it being necessary to effect an adjustment, such as an automobile suspension with trailing arms for example.

13 Claims, 4 Drawing Sheets

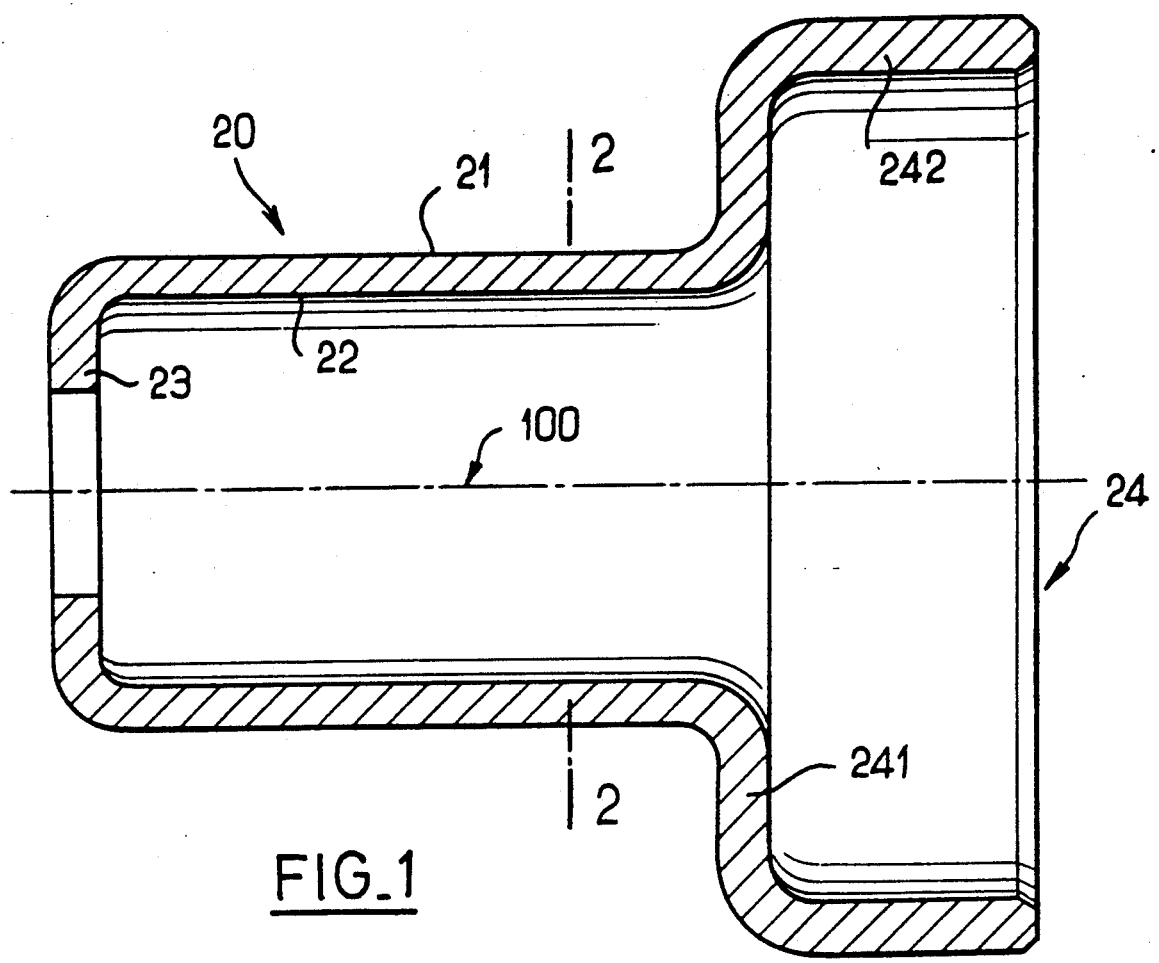
FIG_1
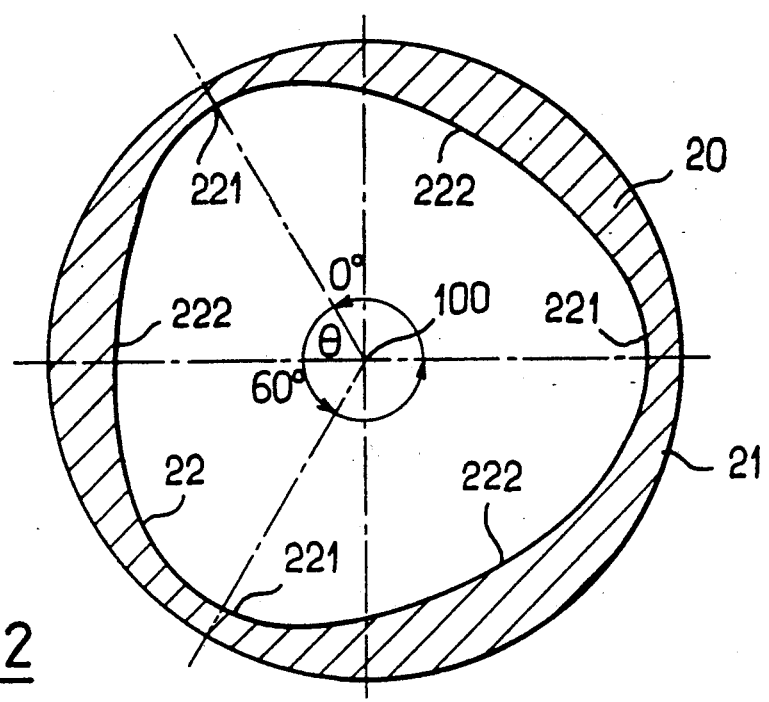
FIG_2

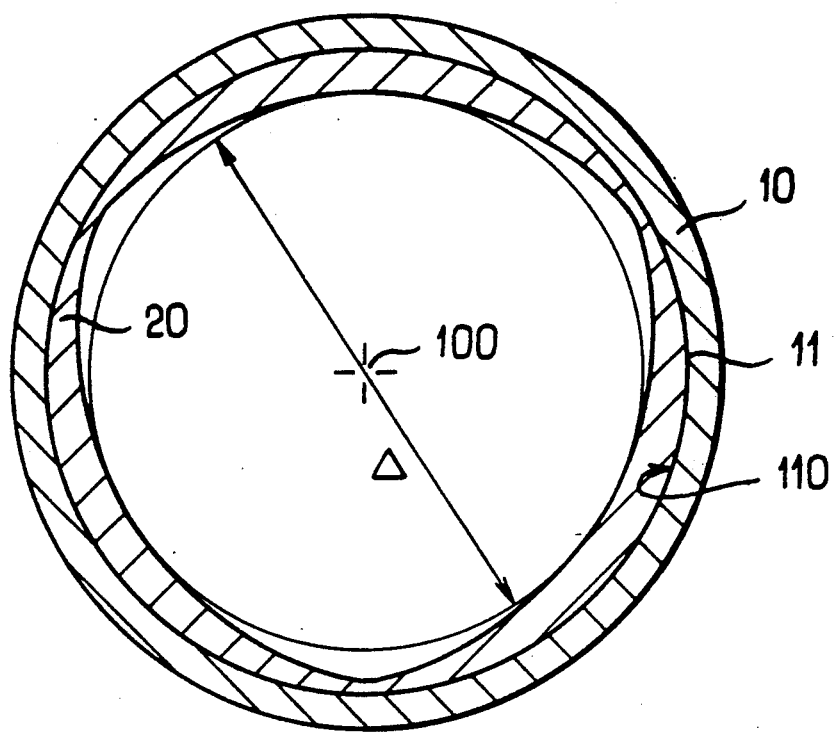
FIG_3
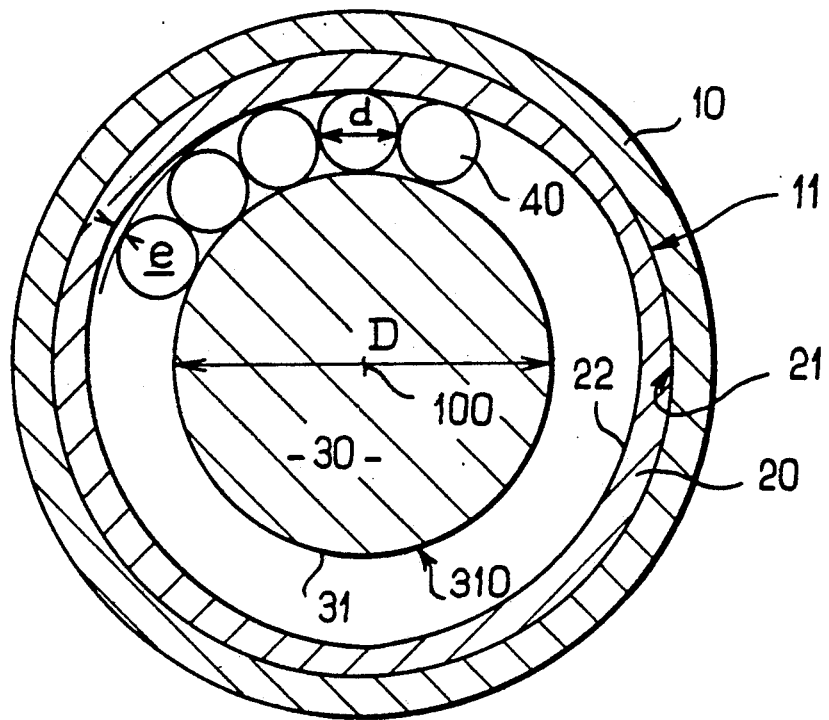
FIG_4

PRESTRESSED ROLLING RADIAL BEARING AND ITS APPLICATION PARTICULARLY TO AUTOMOBILE SUSPENSIONS

The invention relates to prestressed bearings and, more particularly, the subjects of the invention are a prestressed rolling radial bearing and its application, particularly, to automobile suspensions.

Prestressed, in particular radial, bearings are well known in the state of the art.

A solution to this type of bearing is, for example, disclosed in French Patent 1,079,848. In this document, a bearing with mobile rolling elements which are arranged between two races is such that a local reduction is created in the radial play between the two facing races against which the rolling elements circulate, which is less than the diameter of these rolling elements so that the latter are subject to a prestress and to an elastic deformation when they cross this space of reduced dimension. To arrive at this, at least one depression is set up in the circumferential surround of at least one of the races in order to create this local reduction in the radial play. In this type of bearing, the track which exhibits this depression is formed in a relatively thick bush which is either machined, or subjected to external forces in order to generate these differences in radial play.

In other solutions, the prestress is obtained with the aid of elastic elements, for example rubber or metallic, separate from the races.

It is observed that this type of prestressed radial bearing is not free of disadvantages. In fact, either thick bushes are used which must be specially machined or subjected to constraints with the aid of external devices, or appended elastic elements must be called upon.

This type of disadvantage, for example, weighs on the costs of construction and of mounting and noticeably increases the overall radial dimension of such a bearing.

The object of the invention is to remedy most of these disadvantages by seeing to it that the constraints connected with the use of races borne by relatively thick bushes and with the use of auxiliary elastic elements to ensure the prestress are overcome.

The subject of the invention is a prestressed rolling radial bearing in which rolling elements are interposed between two races and which is characterized in that it comprises an external piece with a cylindrical housing having an axis and an internal wall with circular cross-section, a hollow insert sleeve having an external wall with circular cross-section and an internal wall with curvilinear triangular cross-section the vertices of which are separated by arcs the concavity of which is turned towards this axis, an internal piece with an external seating having an external wall with circular cross-section of given diameter, and rolling elements of specified diameter which are interposed between hollow sleeve and external seating and which bear, on the one hand, on the circumference of the external wall of this seating which serves as internal race and, on the other hand, on the arcs of this internal wall of the sleeve which serves as external race. This bearing is also characterized in that the sleeve is tightly engaged in the housing of the external piece in such a way that their own internal wall and external wall are applied against one another so that the external piece exerts a prestress on the sleeve, in that the perimeter of the curvilinear triangular cross-section of the internal wall of the sleeve is larger than the circumference of a circle the diameter of which is equal to the sum of the diameter of the circular cross-section of the external wall of the seating increased by twice the diameter of the rolling elements, and in that the diameter of an inscribed circle tangent to the arcs of the internal wall with curvilinear triangular cross-section is less than the diameter of the circular cross-section of the external wall of the seating increased by twice the diameter of the rolling elements.

The subject of the invention is also the application of such a bearing, in particular to automobile suspensions, for example with trailing arms.

Other characteristics of the invention will emerge on reading the description and the claims which follow, as well as on examining the attached drawing, given merely by way of example, in which:

FIG. 1 is a partial meridional section of a constituent part of a bearing according to the invention;

FIG. 2 is a cross-section along the line 2—2 of FIG. 1;

FIG. 3 is a cross-section of a part of a bearing according to the invention;

FIG. 4 is a view similar to that of FIG. 3 of a complete, assembled bearing according to the invention;

Figure 6A:
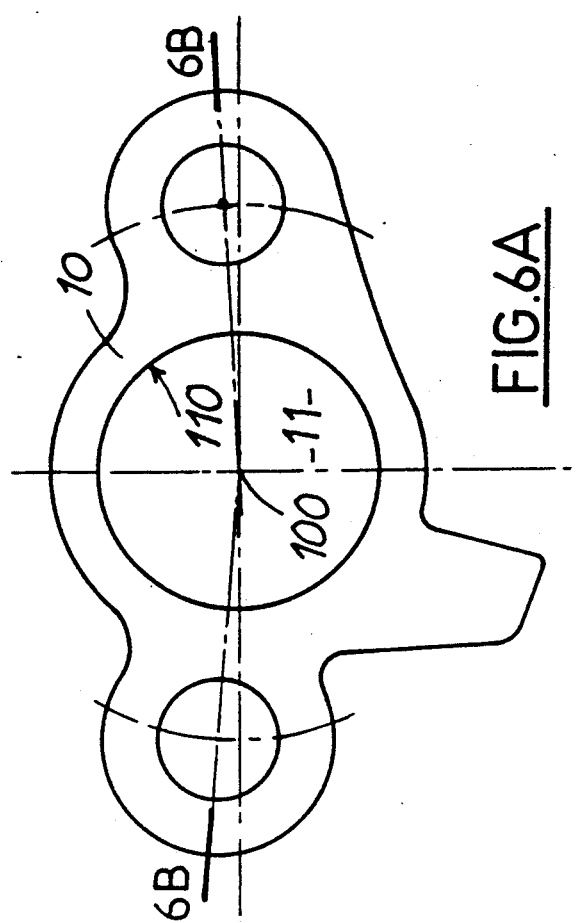
FIG. 6A and FIG. 6B are respectively front and sectional views along the line 6B of FIG. 6A, of an embodiment of an external piece of a bearing according to the invention.

Prestressed rolling radial bearings being well known in the art, only that which directly or indirectly relates to the invention will be treated in what follows. For the remainder, the expert in the relevant art will draw on the current conventional solutions at his disposal in order to meet the particular problems with which he is confronted.

In what follows, a like reference numeral always designates a like constituent whatever the embodiment.

Figure 5:
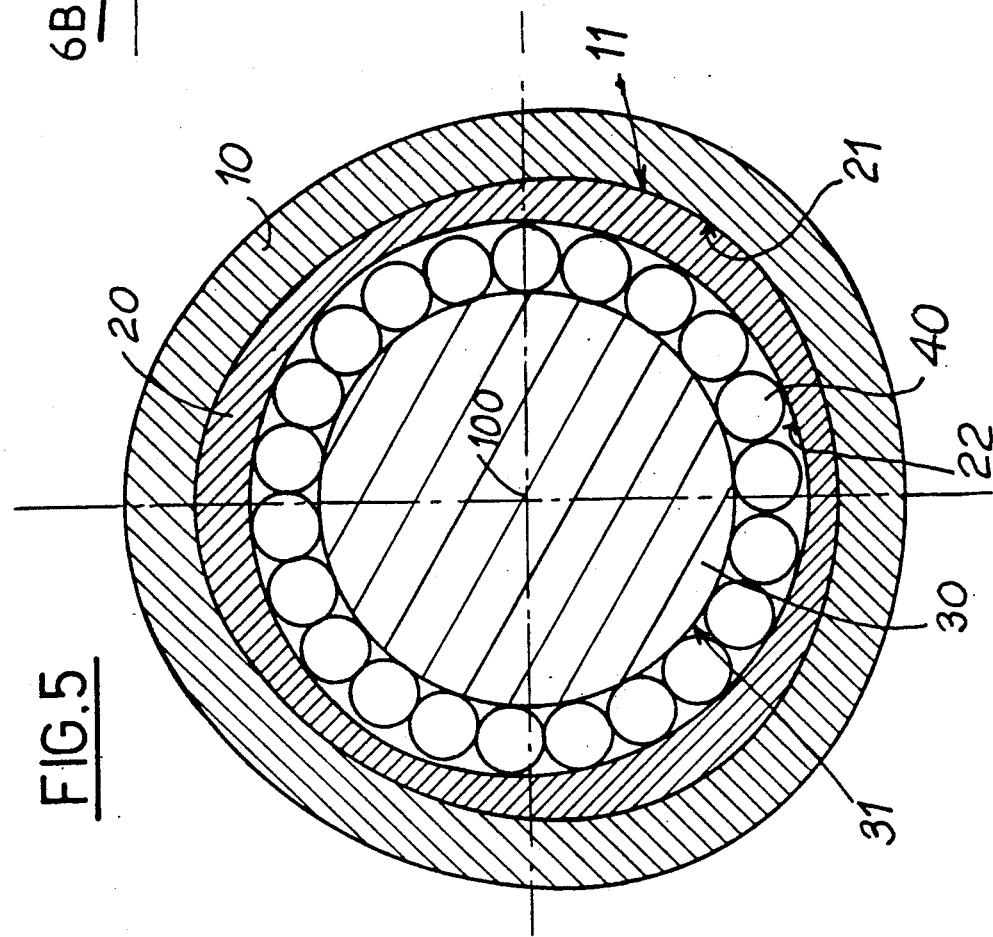
FIG. 5 is a view similar to that of FIG. 4 with noticeably enlarged dimensions so as to schematically illustrate the way in which the housing of the bearing distorts.

As is seen, in particular, on examining FIG. 4 or FIG. 5, a prestressed rolling radial bearing according to the invention comprises, essentially, an external piece 10, a hollow insert sleeve 20, an internal piece 30 and rolling elements 40 interposed between hollow insert sleeve 20 and internal piece 30.

For the convenience of the exposition, each of the constituents of a bearing according to the invention will be successively described before describing the mounting and the operation thereof.

The external piece 10 is provided with a cylindrical housing 11. This housing 11 has an axis 100 and an internal wall 110 with circular cross-section. This internal wall with circular cross-section has a specified given diameter.

Figure 6B:
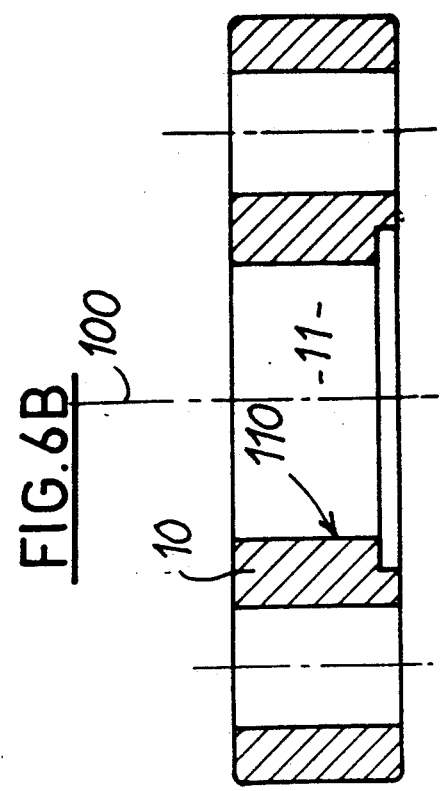

This external piece 10 is, for example, part of a trailing arm of an automobile suspension one embodiment of which is partially illustrated, for example, in FIGS. 6A and 6B.

The hollow insert sleeve 20 has an external wall 21 with circular cross-section the diameter of which is at least equal to the specified given diameter of the circular cross-section of the internal wall 110 of the housing 11. Also, this sleeve 20 has an internal wall with curvilinear triangular cross-section. This curvilinear triangular cross-section comprises relatively rounded vertices 221 separated by arcs 222 the concavity of which is directed towards the axis 100. Vertices and arcs are regularly distributed and interposed in such a way as to achieve an equilateral configuration for example.

The geometry of this part of the sleeve stands out particularly well on examining the relatively schematic cross-section in FIG. 2, the dimensions of which are not to scale so as to facilitate illustration and understanding. As can be seen therein, this sleeve exhibits the form of a relatively thin bush the thickness of which is not constant. As can be observed, this geometry has a symmetry of rotation, for example, of order three in relation to the axis 100 and also an orthogonal symmetry for each of its spans.

If necessary, the sleeve 20 also has, for example, at one of its ends a centripetal radial rim 23, and at its opposite end a collar 24 which has a flat toroidal rear end 241 finished by an axial ring 242.

The internal piece 30 is provided with an external seating 31. This seating 31 has an external wall 310 with circular cross-section.

This piece 30 is, for example, a shaft intended to support one arm of an automobile suspension.

The rolling elements 40, for example rollers or needles, are interposed between the hollow insert sleeve 20 and the external seating 31 of the internal piece 30. Clearly, these rolling elements may also be spherical or conical shaped.

As can be observed in FIG. 4, preferably, the rolling elements are supported over all the circumference of the external wall of the internal piece, which thus serves as race, and are only locally supported over a part of the length of the arcs of the internal wall of the sleeve, outside the vicinity of the vertices of the curvilinear triangular cross-section, which thus serves as race. However, it will be observed that such a mounting is not absolutely imperative.

According to the invention, the dimensions suitable for the specified given diameter of the circular cross-section of the internal wall of the cylindrical housing, on the one hand, and for the diameter of the circular cross-section of the external wall of the insert sleeve, on the other hand, are chosen in such a way that the sleeve 20 can be tightly engaged in the housing 11 so that the external piece 10, and it alone, exerts a prestress on the sleeve.

Similarly, according to the invention, the perimeter of the curvilinear triangular cross-section of the internal wall 22 of the sleeve 20 is larger than the circumference of a circle the diameter of which is equal to the sum of the diameter D of the circular cross-section of the external wall 310 of the seating 31 of the internal piece 30 increased by twice the diameter d of the rolling elements 40.

Also, according to the invention, the diameter a of an inscribed circle internally tangent to the arcs 222 of the curvilinear triangular cross-section of the internal wall 22 of the sleeve 20 is less than the diameter D of the circular cross-section of the external wall 310 of the seating 31 of the internal piece 30 increased by twice the diameter d of the rolling elements 40.

The sleeve 20 is, preferably, a relatively thin bush, obtained, for example, by press-forming or by any other suitable technique. In polar coordinates, the thickness of this bush varies in accordance with the table hereinunder, given by way of example:

| $\theta°$ | 0 | 5 | 10 | 15 | 20 | 25 | 30 | 35 | 40 | 45 | 50 | 55 | 60 |
|---|---|---|---|---|---|---|---|---|---|---|---|---|---|
| Sleeve Thickness Variation | 0 | 0.006 | 0.021 | 0.017 | 0.080 | 0.119 | 0.160 | 0.201 | 0.240 | 0.173 | 0.299 | 0.314 | 0.320 |

As can be realized, the prestress is exerted by the lone elastic deformation of the housing in which the sleeve is tightly mounted and, preferably, in such a way that the axial position of the sleeve in the housing results only from this constraint, without it being necessary to use an axial stop device. Hence, it is understood that the outside geometry of the external piece is not critical and that the only important fact is that it should have an elastic behavior in order to develop the prestress.

When the bearing according to the invention is assembled as illustrated in the section in FIG. 4 or 5, it is seen that the internal piece 30, once introduced, is always prestressed in the regions of the arcs 222 but that, in contrast on the other hand, there still exists a certain play or gap e between the race of the internal wall of the sleeve and the external envelope of the path described by the rolling elements 40, in the vicinity of the vertices.

By virtue of the geometries adopted according to the invention, the positioning of the internal portion 30 causes a deformation of the housing 11 associated with the existence of the gap e which has just been indicated. In fact, if this gap did not exist and if the internal piece 30 were mounted under prestress, the tightening would be entirely reflected through an extension of the housing 11: the result of this would be the generation of much larger prestresses, incompatible with correct operation and relatively easy mounting.

Emerging from the above, a relatively thin bush, for example press-formed, is used, and is force-fitted into a housing which, alone, acts as spring in order to develop the prestress. By virtue of the thickness variation given to the sleeve, the pre-stress is not obtained through a circumferential lengthening of the assembly.

It is understood that at the time of mounting, during the engagement of the internal piece into the external piece equipped with its sleeve, the regions of the arcs tend to be pushed outwards which, in view of the absence of possible elongation, tends to bring the vertices closer to the axis. The peripheral length remaining practically constant, a geometric deformation is obtained free of any creep of the material. This is illustrated schematically and noticeably enlarged in FIG. 5.

In the case of the application to automobile suspensions with trailing arms, it is necessary to define the geometric axis of oscillation of this arm with the aid of two bearings. An external piece 10 for this type of application is shown in the FIGS. 6A and 6B.

For example, in the embodiment shown and described, the hollow insert sleeve 20 is provided, in the vicinity of one of its ends, with a collar 24 with a relatively flat toroidal rear end 241 edged with an axial ring 242. This collar is intended, for example, to receive a sealing joint of the type, for example, expounded in the document FR 2,568,328.

In one embodiment, the sleeve is, for example, made from a 15MC grade steel which is subjected to a surface heat treatment. In one embodiment, the external wall 21 of the sleeve 20 has a diameter of the order of 58 mm and a length of about 20 mm. The rim 23 has, for example, a width of about 3 mm, the rear end 241 a width of about 4 mm and the ring 242 an axial length of about 6 mm.

Figure 7:
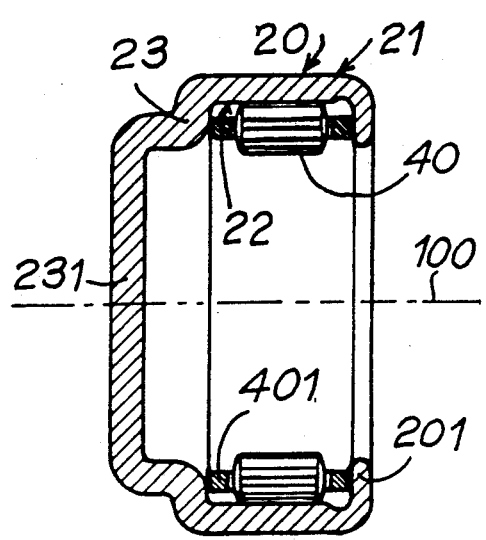
FIGS. 7, 8 and 9 are partial views, in meridional section, of various embodiments of hollow insert sleeves of a bearing according to the invention, which are equipped with rolling elements made from rollers or needles, mounted in a cage.

For the embodiment in FIG. 7, the insert sleeve 20 comprises, at one end, a rim 23 finished by a cup 231 and, at the other end, a centripetal radial peripheral fold 201. The rolling elements 40 are rollers housed in a cage 401.

Figure 8:
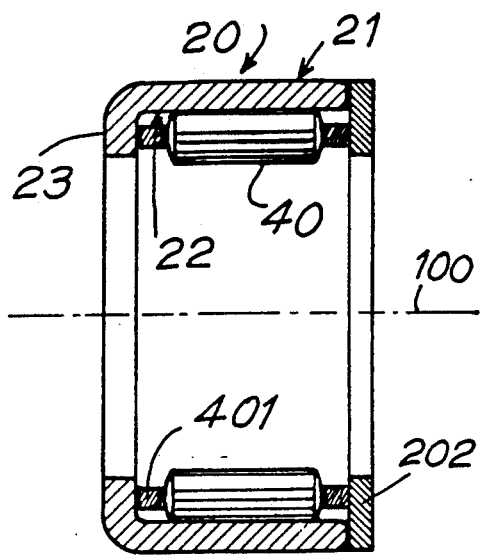

The embodiment in FIG. 8 comprises, at one end, a rim 23 similar to that illustrated in FIG. 1 and, at the other end, an annular flange 202. Here, the rolling elements 40 are needles.

Figure 9:
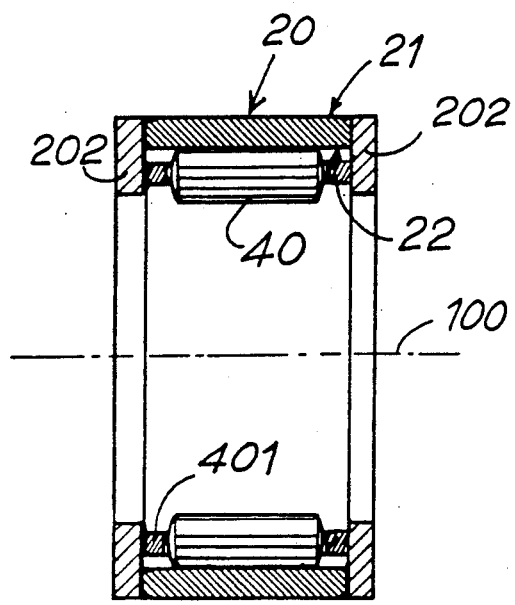

The embodiment in FIG. 9 comprises two flanges 202.

Figure 10:
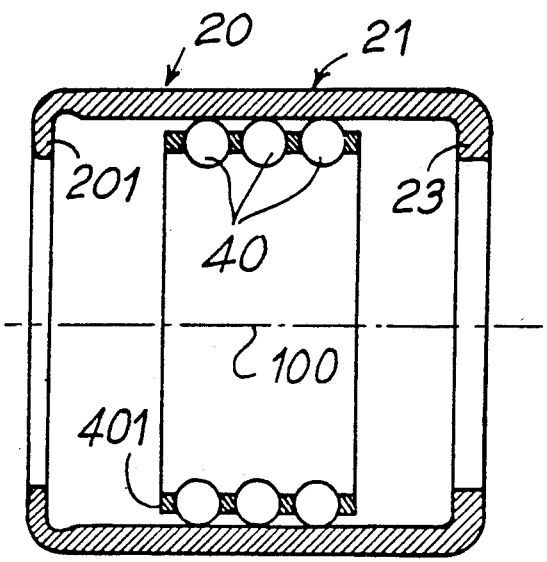
FIG. 10 is a view similar to those of FIGS. 7, 8 and 9 of another variant in which the rolling elements are balls.

The embodiment in FIG. 10 comprises a hollow insert sleeve 20 with a rim 23 and fold 201. Here, the rolling elements 40 are balls housed in a cage 401.

The above makes it possible to immediately realize the value of the invention by virtue of which a prestressed radial bearing of the rolling type is obtained which uses an external race borne by a relatively thin bush obtained, for example, by press-forming, confined in a housing which alone exerts the elastic prestress.

The bearing according to the invention is generally suitable for all the applications in which it is necessary to obtain a bearing effect in the slightest radial play or with prestress, without it being necessary to effect an adjustment.

We claim:

1. Prestressed rolling radial bearing in which rolling elements are interposed between two races, characterized in that it comprises an external piece (10) with a cylindrical housing (11) having an axis (100) and an internal wall (110) with circular cross-section, a hollow insert sleeve (20) having an external wall (21) with circular cross-section and an internal wall (22) with curvilinear triangular cross-section the vertices (221) of which are separated by arcs (222) the concavity of which is turned towards this axis (100), an internal piece (30) with an external seating (31) having an external wall (310) with circular cross-section of specified given diameter (D), and rolling elements (40) of specified diameter (d) which are interposed between sleeve (20) and seating (31) and which bear, on the one hand, on the circumference of the external wall (310) of the seating (31) which serves as internal race and, on the other hand, on the arcs (222) of the internal wall (22) of the sleeve (20) which serves as external race, and characterized in that the sleeve (20) is tightly engaged in the housing (11) of the external piece (10) in such a way that the latter exerts a prestress on the sleeve, in that the perimeter of the curvilinear triangular cross-section of the internal wall (22) of the sleeve (20) is larger than the circumference of a circle the diameter of which is equal to the sum of the diameter (D) of the circular cross-section of the external wall (310) of the seating (31) increased by twice the diameter (d) of the rolling elements (40), and in that the diameter (Δ) of an inscribed circle tangent to the arcs (222) of the wall (22) with curvilinear triangular cross-section is less than the sum of the diameter (D) of the circular cross-section of the external wall (310) of the seating (31) increased by twice the diameter (d) of the rolling elements (40).

2. Bearing according to claim 1, characterized in that said external piece (10) has a portion with a bore and in that said bore constitutes said cylindrical housing (11), said alone acting as spring in order to develop a prestress on said sleeve (20) without circumferential lengthening of an assembly comprising said internal piece, said insert sleeve and said external piece.

3. Bearing according to claim 1 or claim 2, characterized in the said prestress ensures the axial position of said sleeve (20) in said housing (11) of said external piece (10).

4. Bearing according to claim 1 or claim 2, characterized in that said sleeve (20) is a relatively thin bushing the thickness of which is not constant.

5. Application of a bearing according to claim 1 or claim 2 to systems in which it is necessary to obtain a bearing effect without the slightest radial play without it being necessary to effect an adjustment.

6. Application of a bearing according to claim 1 or claim 2, in particular to automobile suspensions, for example, with trialing arm.

7. Bearing according to claim 1, characterized in that said rolling elements (40) are rollers.

8. Bearing according to claim 1, in which said rolling elements are needles.

9. Bearing according to claim 1, in which said rolling elements are balls.

10. A prestressed rolling radial bearing comprising,
a cylindrical housing having an internal wall of circular cross-section,
a brushing fitting tightly in said housing and having an external wall of circular cross-section and an internal wall comprising a plurality of inwardly concave arcuate surfaces joined by rounded vertices,
an inner member having an outer surface of cylindrical cross-section, and
a multiplicity of rolling elements between said inner member and said bushing,
said internal wall of said bushing having a configuration in which a circle inscribed internally tangent to central portions of said arcuate surfaces of said bushing, when unassembled, has a diameter less than the sum of the diameter of said outer surface of said inner member and twice the diameter of said rolling elements, and a circle externally tangent to central portions of said vertices has a diameter greater than the sum of the diameter of said outer surface of said inner member and twice the diameter of said rolling elements.

11. Bearing according to claim 10, in which said inner member is a shaft for supporting one arm of an automobile suspension.

12. Bearing according to claim 10, in which said housing comprises a radially projecting arm.

13. Bearing according to claim 10, in which said housing comprises a radially projecting apertured arm.

* * * * *